Figure 1:
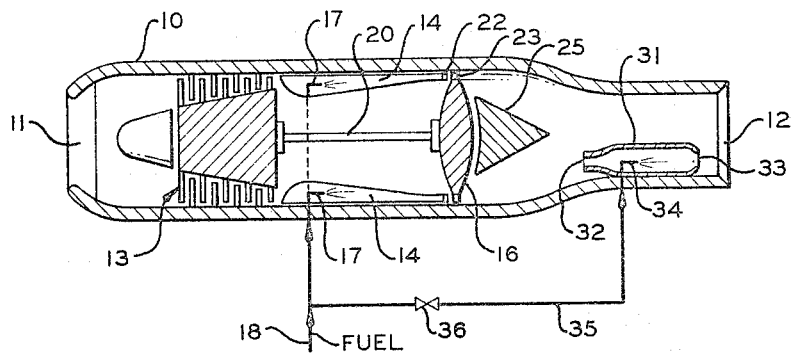

Dec. 6, 1966    R. M. SCHIRMER    3,289,409
HIDING CONDENSATION TRAILS FROM HIGH ALTITUDE AIRCRAFT

Filed July 13, 1964    2 Sheets-Sheet 1

INVENTOR.
R.M. SCHIRMER
BY Young & Quigg
ATTORNEYS

INVENTOR.
R.M. SCHIRMER

BY Young & Quigg

ATTORNEYS

United States Patent Office 3,289,409
Patented Dec. 6, 1966

3,289,409
HIDING CONDENSATION TRAILS FROM HIGH ALTITUDE AIRCRAFT
Robert M. Schirmer, Bartlesville, Okla., assignor to Phillips Petroleum Company, a corporation of Delaware
Filed July 13, 1964, Ser. No. 382,168
10 Claims. (Cl. 60—205)

This invention relates to method and means for hiding condensation trails of high altitude aircraft from ground observation.

The combustion of a pound of jet fuel in a jet engine results in the production of more than a pound of water vapor. The water vapor, since it absorbs light strongly only in the infrared region, is normally invisible. However, at low temperatures (for example the temperature above 40,000 feet is about —50° F.) the water vapor quickly solidifies. Thus the water changes from a vaporous material having a discrete molecular spectrum to a solid material which scatters light throughout the visible spectrum in a nonselective manner. The result is a large cloud of highly light reflecting particles which is readily apparent to observers on the ground. The military disadvantages of such visible contrails, in certain critical situations, are readily apparent. At altitudes at which the aircraft is difficult if not impossible to be seen from the ground, the huge contrail emanating from its engines easily reveals the presence and direction of travel of the aircraft to any ground observer.

Accordingly, it is an object of the invention to render contrails from a high altitude aircraft invisible to an observer on the ground. It is an object of the invention to provide novel method and means for hiding contrails produced by aircraft at high altitudes. Another object of the invention is to provide more militarily effective aircraft operation.

Other aspects, objects and advantages of the invention will be apparent from a study of the disclosure, the drawings and the appended claims.

In accordance with the present invention, carbon black is introduced into the engine exhaust stream whenever it is desired to hide the contrail. The emanating carbon black, which behaves as a classical "black body," absorbs the radiant light energy from the ice particles and reradiates this energy according to the temperature of the surroundings. This reradiated energy is in the infrared range and thus invisible to an observer on the ground. The carbon black is not visible to the ground observer as it does not reflect any visible light and does not cast a shadow due to the virtual blackness of outer space. In one aspect of the invention the carbon black is produced in situ by burning a portion of the jet fuel in the engine exhaust stream under suitable carbon black forming conditions. In another aspect of the invention preformed carbon black is injected into the engine exhaust stream.

Figure 2:
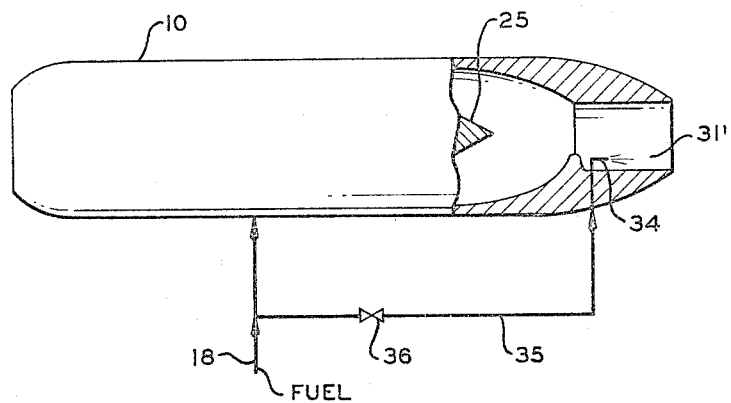
Figure 3:
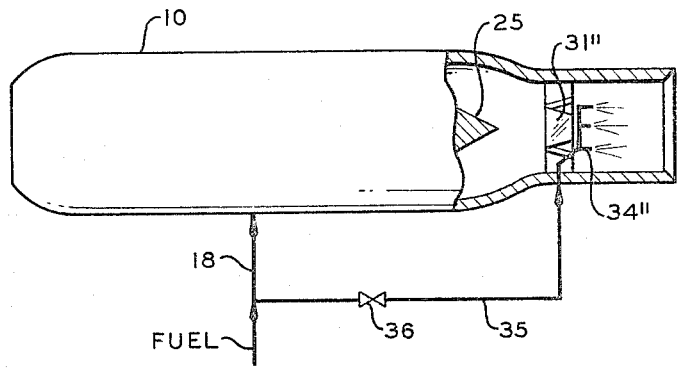
Figure 4:
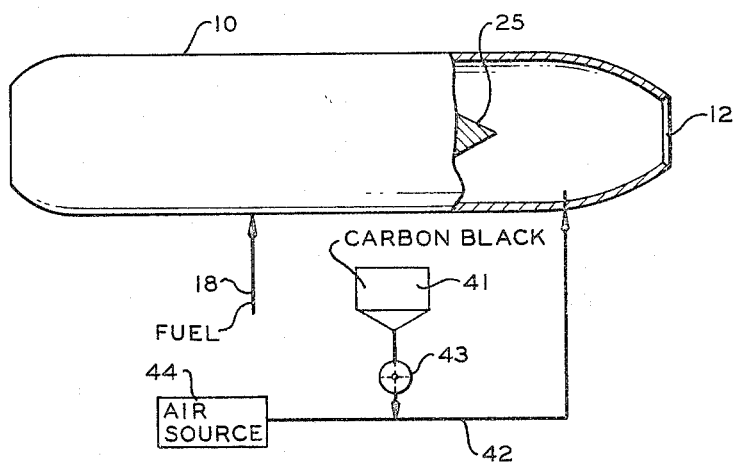

In the drawings FIGURE 1 is a schematic view, shown partially in cross section, of a jet engine incorporating a carbon black-forming means in accordance with one embodiment of the invention; FIGURES 2 and 3 are modifications of FIGURE 1 illustrating additional types of carbon black-forming means which can be utilized; and FIGURE 4 illustrates a modification of FIGURE 1 utilizing preformed carbon black.

Referring now to the drawings and to FIGURE 1 in particular, the illustrated turbojet engine comprises a casing or housing 10 of essentially circular cross section, having an air intake 11 and a discharge nozzle 12. Proceeding from the inlet end to the outlet end, casing 10 contains an air compressor 13, a plurality of combustion chambers 14 arranged annularly around the engine at equally spaced intervals, and a gas turbine 16. While only two combustion chambers 14 are shown for sake of simplicity, more than two and frequently four to twelve combustion chambers can be utilized in a turbojet engine. Air supplied by compressor 13 is employed to support combustion of fuel injected into combustion chambers 14 through fuel nozzles 17 which are fed by fuel line 12. The greatly expanded volume of resulting heated gases is fed through turbine 16 and thence outwardly through discharge nozzle 12. The purpose of turbine 16 is to drive air compressor 13 through a shaft 20 connecting the rotor assembly of turbine 16 with the rotor assembly of air compressor 13. Turbine 16 includes a peripheral set of stationary vanes 22 and a movable set of blades 23 disposed adjacent thereto. Located centrally within the engine casing 10 is a discharge air regulating plug 25 which is suspended therein by appropriate structure not shown.

In accordance with the invention, a secondary combustion chamber 31 is located within the tail pipe of the engine. Chamber 31 has a gas inlet 32, an exhaust outlet 33 and a fuel nozzle 34. Line 35 containing valve 36 connects nozzle 34 to fuel line 18. At high altitudes the jet engine is operated with a very high air to fuel ratio, for example in the range of about 35 to about 70 or about 250 to 500 percent of the stoichiometric ratio. The exhaust gases thus contain a high concentration of oxygen. A portion of these exhaust gases passes into and through combustion chamber 31. When it is desired to hide the contrail, the pilot can actuate valve 36 to supply jet fuel to combustion chamber 31. Chamber 31 is operated under conditions suited to the production of carbon black. For example, valve 36 is positioned to provide an oxygen to fuel ratio less than stoichiometric and generally in the range of about 0.7 to about 2.5, the stoichiometric oxygen to fuel ratio being approximately 3.2. This corresponds to a range of approximately 20 to 80 percent of stoichiometric ratio which provides a strongly "fuel-rich" situation. The presently preferred oxygen to fuel ratio is in the range of about 30 to about 50 percent of the stoichiometric ratio. The temperature of the exhaust gases from the primary combustion chambers is sufficiently high to ignite the fuel in chamber 31 and is generally in the range of about 700° F. to about 1500° F. The combustion chamber 31 is sufficiently long to provide adequate residence time. The length of chamber 31 necessary to provide the desired residence time can be shortened by providing means for reducing the velocity of the gases therethrough, for example a high ratio of the internal diameter of chamber 31 to the internal diameter of inlet 32. While the residence time together with other variables such as temperature, pressure, geometry, turbulence, etc. may be important for making suitable black for reinforcing rubber, the air/fuel ratio is the key variable in the present operation. The carbon black thus produced is continuously blended with the remainder of the exhaust gases from the primary combustion chambers. Once the carbon particles are formed they will withstand exposure to the hot exhaust gases without significant change.

Referring now to FIGURE 2, secondary combustion chamber 31' is formed by a "hollowed-out" cavity or indentation in the inner wall of the tail pipe. In FIGURE 3 the secondary combustion chamber 31" is formed by a doughnut having a triangular cross section with the apex of the triangle pointing upstream and the base of the triangle being open. A ring spray 34" is positioned within the doughnut for the introduction of fuel into the "quiet" area provided by the doughnut baffling. While the secondary combustion chamber has been illustrated as being positioned within the tail section of the jet engine and utilizing the gaseous exhaust of the primary combustion chamber as the air supply for the secondary combustion chamber, it is within the contemplation of the invention to utilize a secondary combustion chamber positioned outside of the jet engine. Such exterior secondary combustion chamber could utilize atmospheric air as an oxygen source. In such instances a separate ignition system could be provided. The effluent from the secondary combustion chamber can be admixed with the exhaust of the primary combustion chambers before or after such exhaust passes through the exhaust outlet of the jet engine.

By its nature, carbon black particularly in the finely divided state produced by incomplete combustion provides a large number of particles per unit weight. Generally the carbon black can be produced from the hydrocarbon fuel with about 50 percent efficiency, that is, about 50 percent of the available carbon is converted to carbon black. Thus only a small amount of the fuel, for example in the range of .01 to about 5 weight percent of the jet fuel, need be diverted to the production of the carbon black required to accomplish the objects of the invention. The practice of the invention, therefore, entails no large penalty in fuel consumption.

The fuel for the secondary combustion chamber can be any conventional hydrocarbon fuel. In a presently preferred embodiment the fuel for the secondary combustion chamber is the same as that for the jet engine and can be drawn from the main fuel tanks of the aircraft. If desired, separate fuels can be used for this purpose and aromatic hydrocarbons, for example benzene, toluene, xylene, alpha-methylnaphthalene, and the like, are particularly suitable due to the high carbon content.

The present invention is applicable to any aircraft engine and is particularly suitable for gas turbine engines in aircraft capable of high altitude flight. Conventional turbine engines are carefully engineered to burn their fuels as cleanly as possible for purposes of economy as well as cleanliness and visibility at air fields. The present invention modifies these engines so that they are capable of operating not only under the clean burning conditions of normal use but under the carbon producing conditions during periods of desired concealment.

While it is presently preferred to make the carbon black in situ as required, it is also within the contemplation of the invention to utilize preformed carbon black. Referring now to FIGURE 4, carbon black from storage bin 41 is introduced into air line 42 by means of star valve 43. Air from source 44 can transport the carbon black through line 42 into the tail section of the jet engine.

As noted above, the drawings are merely diagrammatic and are not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawings. Suffice to say, the drawings are for illustrative purposes, as are the descriptions thereof.

Reasonable variation and modification are possible within the scope of the foregoing disclosure, the drawings and the appended claims to the invention.

I claim:
1. A method of hiding contrails from high flying aircraft which comprises introducing carbon black into the aircraft engine effluent while the aircraft is at altitudes at which contrails occur.
2. A method in accordance with claim 1 wherein said carbon black is preformed and stored in said aircraft until its use is desired.
3. In a method of operating a jet engine wherein air and fuel are combined in at least one primary combustion chamber with an oxygen to fuel ratio greater than stoichiometric to produce an enlarged volume of exhaust gases and wherein contrails form from said exhaust gases at high altitudes; the improvement comprising combining oxygen and fuel under ignition conditions in a secondary combustion chamber at an oxygen to fuel ratio less than the stoichiometric ratio to produce carbon black, and introducing the carbon black thus formed into said exhaust gases.
4. A method in accordance with claim 3 wherein the oxygen to fuel ratio in the secondary combustion chamber is in the range of about 20 to about 80 percent of the stoichiometric ratio.
5. A method in accordance with claim 4 further comprising utilizing a portion of said exhaust gases as the source of oxygen for said secondary combustion chamber.
6. A method in accordance with claim 5 wherein the fuel supplied to the secondary combustion chamber is in the range of about .01 to about 5 weight percent of the fuel supplied to said at least one primary combustion chamber.
7. A method in accordance with claim 6 wherein the fuel supplied to the secondary combustion chamber comprises aromatic hydrocarbons.
8. Apparatus for hiding contrails from high flying aircraft which comprises an aircraft having at least one jet engine, a container of carbon black, and means for withdrawing carbon black from said container and introducing the thus withdrawn carbon black into the exhaust stream of said at least one jet engine.
9. Apparatus for hiding contrails from high flying aircraft which comprises an aircraft having at least one jet engine wherein air and fuel are combined in at least one primary combustion chamber with an oxygen to fuel ratio greater than stoichiometric to produce an enlarged volume of exhaust gases, a secondary combustion chamber, means for combining fuel and oxygen under ignition conditions at an oxygen to fuel ratio less than the stoichiometric ratio in said secondary combustion chamber to produce carbon black, and means for introducing the carbon black thus produced into said exhaust gases.
10. Apparatus in accordance with claim 9 wherein said secondary combustion chamber is positioned outside of said jet engine and said means for combining comprises means for admixing atmospheric air and fuel at an oxygen to fuel ratio in the range of about 20 to about 80 percent of the stoichiometric ratio.

References Cited by the Examiner
UNITED STATES PATENTS

| | | | |
|---|---|---|---|
| 2,232,728 | 2/1941 | Pleasants | 239—2 |
| 2,756,097 | 7/1956 | Brandau et al. | 239—2 X |

MARK NEWMAN, *Primary Examiner.*

D. HART, *Assistant Examiner.*